(12) United States Patent
Mathena

(10) Patent No.: US 10,160,913 B2
(45) Date of Patent: Dec. 25, 2018

(54) SHALE-GAS SEPARATING AND CLEANOUT SYSTEM

(71) Applicant: MATHENA, INC., El Reno, OK (US)

(72) Inventor: Harold Dean Mathena, Edmond, OK (US)

(73) Assignee: MATHENA, INC., El Reno, OK (US)

( * ) Notice: Subject to any disclaimer, the term of this patent is extended or adjusted under 35 U.S.C. 154(b) by 0 days.

(21) Appl. No.: 14/310,410

(22) Filed: Jun. 20, 2014

(65) Prior Publication Data

US 2014/0299443 A1    Oct. 9, 2014

Related U.S. Application Data

(63) Continuation of application No. 14/049,726, filed on Oct. 9, 2013, now Pat. No. 8,784,545, which is a continuation of application No. PCT/US2011/032122, filed on Apr. 12, 2011.

(51) Int. Cl.
    *C10G 1/00* (2006.01)
    *C10G 1/04* (2006.01)

(52) U.S. Cl.
    CPC .............. *C10G 1/045* (2013.01); *C10G 1/00* (2013.01)

(58) Field of Classification Search
    CPC .................................. C10G 1/045; C10G 1/00
    USPC ...................................... 96/155–220; 196/46
    See application file for complete search history.

(56) References Cited

U.S. PATENT DOCUMENTS

| | | | |
|---|---|---|---|
| 2,166,516 A | 7/1939 | Bainbridge | |
| 2,909,284 A * | 10/1959 | Watkins | B01D 35/185 |
| | | | 123/196 A |
| D220,696 S | 5/1971 | Lazzo, III | |
| 3,753,336 A | 8/1973 | Drew et al. | |

(Continued)

FOREIGN PATENT DOCUMENTS

| | | |
|---|---|---|
| AU | 352300 | 11/2013 |
| CA | 2729154 | 1/2010 |

(Continued)

OTHER PUBLICATIONS

International Search Report and Written Opinion for PCT/US2011/032122 prepared by the ISA/US dated Jul. 5, 2011, 11 pages.

(Continued)

*Primary Examiner* — T. Bennett McKenzie
(74) *Attorney, Agent, or Firm* — Barta, Jones & Foley, P.C.

(57) ABSTRACT

This invention relates to the separation of shale, gas and fluid at a shale-gas well. The shale debris and water from a shale-gas well is tangentially communicated to a vessel where the cyclonic effect within the vessel facilitates the separation of the gas from the shale debris. The separated shale debris and fluid falls to a jet assembly whereby it encounters a jet communicating a fluid therethrough. A venturi provides a motive force to the shale debris and fluid sufficient to propel it into a collection bin. The shale-gas separator incorporates a fluid bypass overflow line to prevent a buildup of fluid within the vessel. The shale-gas separator also incorporates an internal aerated cushion system (IACS) pipe for further motivating the shale debris and into the jet assembly, to ensure the walls of the vessel are clean, and to provide an air cushion restricting gas migration to the jet assembly.

1 Claim, 17 Drawing Sheets

(56) References Cited

U.S. PATENT DOCUMENTS

| | | |
|---|---|---|
| 3,765,505 A | 10/1973 | Pendleton |
| 3,875,998 A | 4/1975 | Charpentier |
| 3,965,967 A | 6/1976 | Jentzsch et al. |
| 4,154,570 A | 5/1979 | Schwartz |
| 4,294,593 A | 10/1981 | Rehm |
| 4,297,659 A | 10/1981 | Augst |
| 4,373,354 A | 2/1983 | Sawyer |
| 4,397,659 A | 8/1983 | Gowan et al. |
| 4,404,425 A | 9/1983 | Rich |
| 4,474,254 A | 10/1984 | Etter et al. |
| D280,406 S | 9/1985 | Walker |
| 4,635,735 A | 1/1987 | Crownover |
| D288,417 S | 2/1987 | Morrison |
| 4,666,471 A | 5/1987 | Cates |
| 4,697,294 A | 10/1987 | Schaefer |
| 4,737,287 A | 4/1988 | Prendergast |
| 4,762,438 A | 8/1988 | Dewing |
| 5,028,318 A | 7/1991 | Aslin |
| 5,095,822 A | 3/1992 | Martin |
| D334,542 S | 4/1993 | Lowe et al. |
| 5,209,765 A * | 5/1993 | Kolpak et al. ............... 96/157 |
| D336,524 S | 6/1993 | Gary et al. |
| 5,267,367 A | 12/1993 | Wegmann, Jr. |
| D348,230 S | 6/1994 | Francis |
| 5,526,684 A | 6/1996 | Liu et al. |
| 5,599,365 A | 2/1997 | Alday et al. |
| D387,181 S | 12/1997 | David |
| 5,755,527 A | 5/1998 | Dufresne |
| 5,777,266 A | 7/1998 | Herman et al. |
| 5,780,773 A | 7/1998 | Wakamatsu |
| 5,859,430 A | 1/1999 | Mullins et al. |
| 5,919,036 A | 7/1999 | O'Brien et al. |
| 5,928,519 A | 7/1999 | Homan |
| D412,490 S | 8/1999 | Henry |
| D415,112 S | 10/1999 | Henry |
| D415,471 S | 10/1999 | Henry |
| 5,997,284 A | 12/1999 | Gustafson et al. |
| D423,293 S | 4/2000 | Karl |
| D425,627 S | 5/2000 | Fiona et al. |
| 6,067,681 A | 5/2000 | Zeinstra et al. |
| D429,695 S | 8/2000 | Henry |
| D430,543 S | 9/2000 | Rohder |
| D431,488 S | 10/2000 | Slawomir |
| 6,164,308 A | 12/2000 | Butler |
| D436,578 S | 1/2001 | Henry |
| D437,832 S | 2/2001 | Stephen |
| D438,802 S | 3/2001 | Krunas |
| 6,202,565 B1 | 3/2001 | Henry |
| 6,287,047 B1 | 9/2001 | Dufresne |
| 6,431,855 B1 | 8/2002 | Pedersen |
| 6,481,036 B1 | 11/2002 | Duvall |
| 6,499,410 B1 | 12/2002 | Berardi |
| 6,564,619 B2 | 5/2003 | Dutton et al. |
| 6,658,757 B2 | 12/2003 | Fout et al. |
| 6,747,212 B1 | 6/2004 | Henry |
| 6,793,814 B2 | 9/2004 | Fout et al. |
| 6,878,881 B1 | 4/2005 | Henry |
| 6,881,349 B2 | 4/2005 | Mueller |
| D512,134 S | 11/2005 | Lipscomb et al. |
| 6,977,048 B2 | 12/2005 | Mueller et al. |
| 6,989,103 B2 | 1/2006 | Mohsen et al. |
| D521,230 S | 5/2006 | Linz et al. |
| D525,550 S | 7/2006 | Egidio |
| D533,474 S | 12/2006 | Megale et al. |
| 7,145,079 B1 | 12/2006 | Henry |
| 7,152,682 B2 | 12/2006 | Hopper et al. |
| 7,207,399 B2 | 4/2007 | Duhe et al. |
| 7,309,836 B2 | 12/2007 | Lubanski |
| 7,332,097 B2 | 2/2008 | Fout et al. |
| D563,323 S | 3/2008 | Henry |
| 7,377,336 B2 | 5/2008 | Duhe et al. |
| D570,332 S | 6/2008 | Landerholm et al. |
| 7,385,139 B2 | 6/2008 | Lubanski |
| 7,394,025 B1 | 7/2008 | Wong |
| 7,429,327 B2 | 9/2008 | Fout et al. |
| 7,438,142 B2 | 10/2008 | Butler et al. |
| D583,771 S | 12/2008 | Lubanski |
| 7,458,257 B2 | 12/2008 | Pop et al. |
| 7,497,954 B2 | 3/2009 | Ivan et al. |
| 7,503,950 B2 | 3/2009 | Haland et al. |
| 7,507,280 B2 | 3/2009 | Tomshak et al. |
| 7,569,098 B2 | 8/2009 | Oglesby |
| 7,591,605 B2 | 9/2009 | Jonasz et al. |
| 7,592,547 B2 | 9/2009 | Lubanski |
| 7,595,450 B2 | 9/2009 | Lubanski |
| D609,789 S | 2/2010 | Milnes |
| D611,811 S | 3/2010 | Gilbert |
| 7,674,980 B2 | 3/2010 | Lubanski |
| 7,691,259 B2 | 4/2010 | Freeman et al. |
| 7,727,316 B2 | 6/2010 | Mueller et al. |
| 7,744,067 B2 | 6/2010 | Kurukchi et al. |
| 7,795,535 B2 | 9/2010 | Lubanski |
| D625,395 S | 10/2010 | Guzzoni |
| 7,810,197 B1 | 10/2010 | Anthony |
| D627,038 S | 11/2010 | Yu |
| 7,838,772 B2 | 11/2010 | Lubanski |
| 7,862,730 B2 | 1/2011 | McEwen et al. |
| 7,943,851 B2 | 5/2011 | Lubanski |
| 7,947,628 B2 | 5/2011 | Oakley et al. |
| 8,001,643 B1 | 8/2011 | James |
| 8,025,713 B2 | 9/2011 | Dou et al. |
| D647,247 S | 10/2011 | Jones |
| 8,066,870 B2 | 11/2011 | Freeman et al. |
| D650,053 S | 12/2011 | Douglass III |
| D651,107 S | 12/2011 | Bradford et al. |
| 8,083,935 B2 | 12/2011 | Eiá |
| D653,139 S | 1/2012 | Lee |
| 8,087,293 B2 | 1/2012 | Dou et al. |
| 8,119,914 B2 | 2/2012 | Lubanski |
| 8,142,634 B2 | 3/2012 | McCosh |
| D657,277 S | 4/2012 | Dallwig et al. |
| D665,513 S | 8/2012 | Engel |
| D680,891 S | 4/2013 | Dallwig et al. |
| 8,506,821 B2 | 8/2013 | Pruett et al. |
| D690,217 S | 9/2013 | Sands et al. |
| 8,536,524 B2 | 9/2013 | Pomerantz et al. |
| 8,641,811 B2 | 2/2014 | Mathena |
| 8,784,545 B2 | 7/2014 | Mathena |
| D714,174 S | 9/2014 | John et al. |
| D714,175 S | 9/2014 | John et al. |
| D719,519 S | 12/2014 | Mathena |
| D730,317 S | 5/2015 | Silvera |
| 2003/0051881 A1 | 3/2003 | Vinegar et al. |
| 2004/0153281 A1 | 8/2004 | Jaynes |
| 2005/0092523 A1 | 5/2005 | McCaskill et al. |
| 2005/0166759 A1 * | 8/2005 | Ross ............... B01D 19/0042 96/155 |
| 2005/0183574 A1 * | 8/2005 | Burnett ............... B65G 53/10 95/271 |
| 2006/0201671 A1 | 9/2006 | Rogers et al. |
| 2007/0151907 A1 | 7/2007 | Duhe et al. |
| 2007/0175331 A1 | 8/2007 | Tomshak et al. |
| 2008/0078699 A1 | 4/2008 | Carr |
| 2008/0179095 A1 | 7/2008 | Eia |
| 2008/0185813 A1 | 8/2008 | Watson |
| 2008/0190668 A1 * | 8/2008 | Swartout ............... 175/207 |
| 2009/0107337 A1 * | 4/2009 | Vu ............... B01D 46/0021 95/279 |
| 2009/0255560 A1 | 10/2009 | Lehmann et al. |
| 2010/0064893 A1 | 3/2010 | Hopper |
| 2010/0233950 A1 | 9/2010 | Benkert et al. |
| 2010/0242813 A1 | 9/2010 | Takashima et al. |
| 2010/0249540 A1 | 9/2010 | Lisogurski |
| 2011/0105292 A1 | 5/2011 | Walraven et al. |
| 2011/0114389 A1 | 5/2011 | Mathena |
| 2011/0139851 A1 | 6/2011 | McCuen |
| 2011/0186525 A1 | 8/2011 | Dixit |
| 2011/0259581 A1 | 10/2011 | Bedouet et al. |
| 2011/0284288 A1 | 11/2011 | Sawyer et al. |
| 2011/0285647 A1 | 11/2011 | Imamura et al. |
| 2012/0024531 A1 | 2/2012 | Suter |
| 2012/0096895 A1 | 4/2012 | Patel et al. |
| 2012/0179149 A1 | 7/2012 | Delonzor |
| 2012/0238793 A1 | 9/2012 | Cullinane et al. |

(56) References Cited

U.S. PATENT DOCUMENTS

| | | | |
|---|---|---|---|
| 2012/0245014 | A1 | 9/2012 | Jones et al. |
| 2012/0298559 | A1 | 11/2012 | Newman et al. |
| 2013/0031878 | A1 | 2/2013 | Menssen |
| 2013/0047351 | A1 | 2/2013 | Breault |
| 2013/0081368 | A1 | 4/2013 | Mueller |
| 2013/0174524 | A1 | 7/2013 | Inge et al. |
| 2013/0270467 | A1 | 10/2013 | Johnson et al. |
| 2013/0300568 | A1 | 11/2013 | Mathena et al. |
| 2014/0034447 | A1 | 2/2014 | Mathena |
| 2014/0131030 | A1 | 5/2014 | Mathena |
| 2015/0099231 | A1 | 4/2015 | Long et al. |

FOREIGN PATENT DOCUMENTS

| | | |
|---|---|---|
| CH | 697992 B1 | 4/2009 |
| CN | 1669664 A | 9/2005 |
| CN | 2886155 Y | 4/2007 |
| CN | 201046371 Y | 4/2008 |
| CN | 201575838 U | 9/2010 |
| CN | 202270591 U | 6/2012 |
| CN | 102688631 A | 9/2012 |
| CN | 103596697 A | 2/2014 |
| EP | 0050312 A2 | 4/1982 |
| EP | 0185827 A1 | 7/1986 |
| FR | 2641362 A1 | 7/1990 |
| GB | 163186 A | 5/1921 |
| GB | 2177951 A | 2/1987 |
| GB | 2240801 A | 8/1991 |
| GB | 2272425 A | 5/1994 |
| GB | 2441069 B | 7/2008 |
| GB | 4012312 | 9/2009 |
| GB | 4014581 | 1/2011 |
| JP | 07049294 | 2/1995 |
| JP | 11138053 | 5/1999 |
| JP | 2001070469 A | 3/2001 |
| JP | 3588891 B2 | 11/2004 |
| JP | D1258935 S | 11/2005 |
| RU | 2372146 C1 | 11/2009 |
| SG | 194148 | 10/2014 |
| WO | WO-2005094962 A1 | 10/2005 |
| WO | WO 2008/068828 A1 | 6/2008 |
| WO | WO-2008117005 A1 | 10/2008 |
| WO | WO 2009/097869 A1 | 8/2009 |
| WO | WO 2010002360 A1 * | 1/2010 |
| WO | WO-2012092386 A2 | 7/2012 |
| WO | WO-2012141691 A1 | 10/2012 |
| WO | WO-2013106843 A1 | 7/2013 |
| WO | WO-2013170137 | 11/2013 |
| WO | WO-2015051246 | 4/2015 |

OTHER PUBLICATIONS

PCT Article 34 Filed with Demand for PCT/US2011/032122 filed with IPEA on Feb. 11, 2013, 51 pages.
International Preliminary Report on Patentability for Chapter II of the PCT issued for PCT/US2011/032122, as prepared by the IPEA/US on May 20, 2013, 3 pages.
"Advisory Action dated Oct. 22, 2013, by the USPTO, re U.S. Appl. No. 13/000,964".
"Beaver Valley Supply Company: Westfield Portable Drive over Pit, Announced May 27, 2011, www.beavervalleysupply.com/sectiona/westpit.htm".
"Canadian Exam Report dated Jul. 31, 2014, by the CIPO, re App No. 2729154".
"Canadian Exam Report dated May 27, 2015, by the CIPO, re App No. 2729154".
"Canadian Examiner's Report dated Mar. 24, 2014, by the CIPO, re App No. 152825".
"Chinese Office Action, dated Jun. 3, 2015, re App No. 201180071580.8".
"Chinese Office Action dated Oct. 10, 2014, re App No. 201180071580.8".
"Final Office Action dated Sep. 6, 2013, by the USPTO, re U.S. Appl. No. 13/000,964".
"International Preliminary Report on Patentability by the IPEA/US, dated May 13, 2011, regarding PCT/US2008/008143".
"International Preliminary Report on Patentability dated Nov. 20, 2014, by the IB/WO, re PCT/US2013/040530".
"International Search Report and Written Opinion by the ISA/US, dated Oct. 9, 2008, regarding PCT/US2008/008143."
"International Search Report and Written Opinion dated Jan. 14, 2014, by the ISA/US, re PCT/US2013/040530".
"International Search Report and Written Opinion dated Jan. 7, 2015, by the ISA/US, re PCT/US2014/059037".
"Mathena Drive-Over Brochure".
"Mexican Examination Report (1) regarding MX/a/2011/000055, dated 2013".
"Mexican Examination Report (2) regarding MX/a/2011/000055, dated 2014".
"Mexican Examination Report (3) regarding MX/a/2011/000055, dated 2015".
"M-I Swaco; Mud/Gas Separator brochure; 1998".
"M-I Swaco; Super Mud/Gas Separator brochure; 1998".
"M-I Swaco; Toga System brochure; 1999".
"Notice of Allowance dated Aug. 12, 2014, by the USPTO, re U.S. Appl. No. 29/448,068".
"Notice of Allowance dated May 1, 2014, by the USPTO, re U.S. Appl. No. 14/049,726".
"Notice of Allowance dated May 23, 2014, by the USPTO, re U.S. Appl. No. 29/453,843".
"Notice of Allowance dated May 23, 2014, by the USPTO, re U.S. Appl. No. 29/453,882".
"Notice of Allowance dated Nov. 7, 2013, by the USPTO, re U.S. Appl. No. 13/000,964".
"Office Action dated Aug. 14, 2015, by the USPTO, re U.S. Appl. No. 29/476,070".
"Office Action dated Jan. 27, 2014, by the USPTO, re U.S. Appl. No. 14/049,726".
"Office Action dated Jun. 14, 2013, by the USPTO, re U.S. Appl. No. 13/000,964".
"Office Action/Restriction dated Aug. 19, 2015, by the USPTO, re U.S. Appl. No. 14/158,367".
"Office Action/Restriction dated Feb. 7, 2013, by the USPTO, re U.S. Appl. No. 13/000,964".
"Office Action/Restriction dated May 14, 2015, by the USPTO, re U.S. Appl. No. 13/891,425".
"T & S Sales; TFX2 100 Grain Auger, Announced Dec. 24, 2005, http://nwgrainaugers.com/grain-augers/tfx2-series-auger/".
"WP Resources LLC; http://www.w-p-resources.com; 15 pages; Jul. 30, 2013".
"Chinese Office Action, dated Nov. 2, 2015, re App No. 201180071580.8".

* cited by examiner

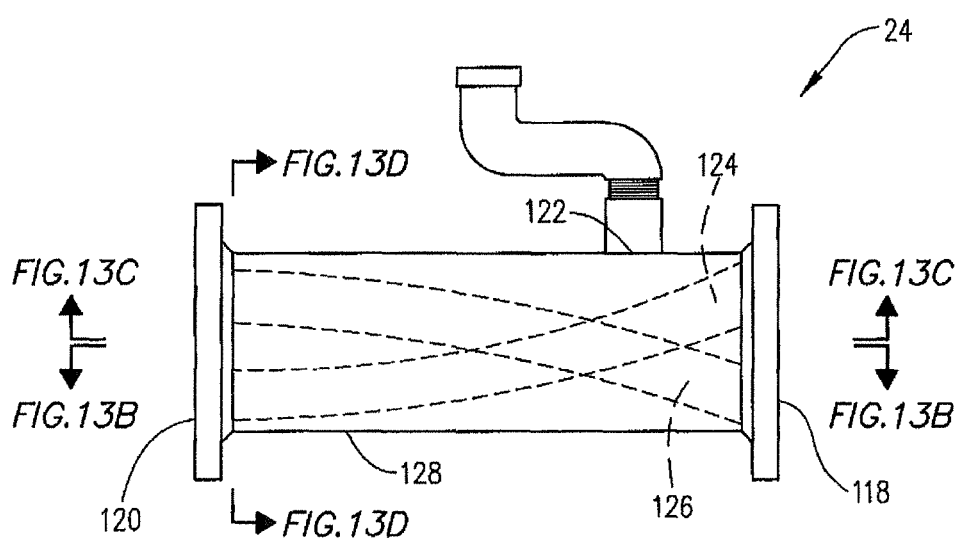
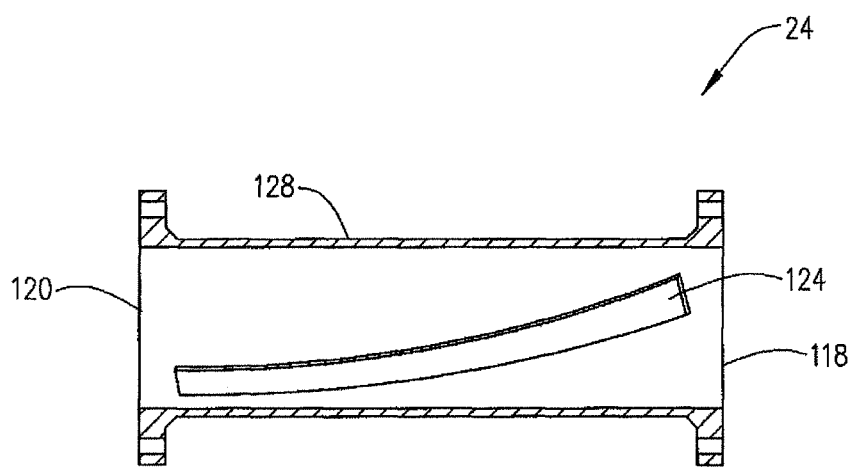
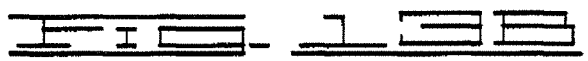

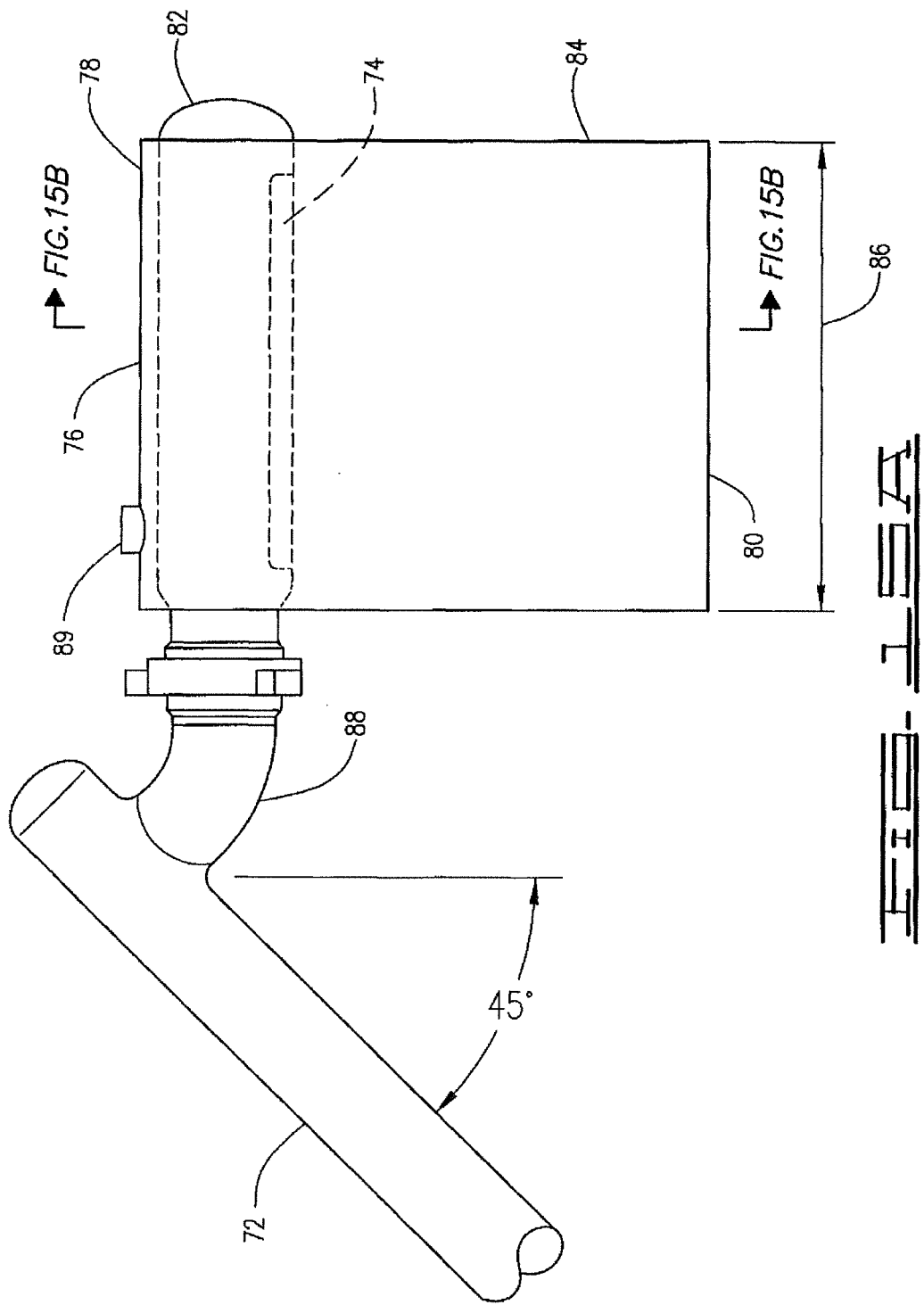

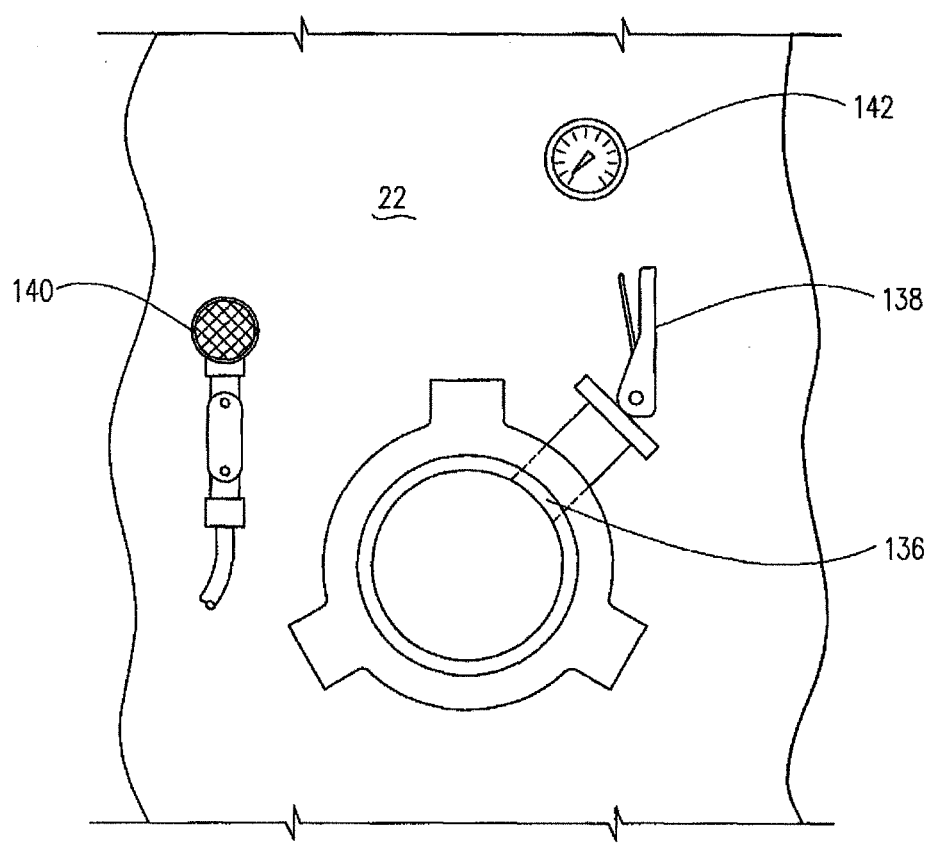
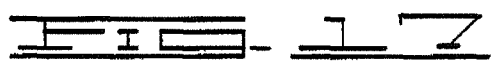

SHALE-GAS SEPARATING AND CLEANOUT SYSTEM

CROSS-REFERENCE TO RELATED APPLICATIONS

This application is a continuation of U.S. application Ser. No. 14/049,726, filed Oct. 9, 2013, which is a continuation of International Application No. PCT/US2011/032122, filed Apr. 12, 2011, the entire disclosures of which are hereby incorporated herein by reference.

BACKGROUND OF THE INVENTION

During the drilling phase of well exploration, it is common to hit pockets of gas and water. When using an air drilling process in a shale formation, shale cuttings, dust, gas and fluid/water create a volatile mixture of hard-to-handle debris; especially when encountering previously fractured formations. Drilling operations and debris disposal account for the majority of the volatility and fire risk during the drilling process. Without limitations, these operations include fluid recovery, gas irrigations and debris disposal.

As the number of wells drilled in a given area increase, the possibility of encountering a fractured formation within an active drilling operation, increases. This possibility presents the drilling operator with a problem of removing shale cuttings, along with dust, fluid/water and gas. There is no effective way to separate the shale cuttings, mute the dust, by-pass the fluid/water encountered, and control/burn the waste gas in the air portion of the drilling program.

Air drilling is one method of drilling into shale formations, but it creates large volumes of dust. Unfortunately, the dust cannot be discharged into the environment due to the many governmental regulations related to dust control for shale-gas drilling operations. Thus, such drilling efforts must overcome this problem or face substantial penalties and fines.

As gas is often encountered during the air drilling operation from a previously fractured formation, a combustible gas cloud may be created and linger near the ground. A similar gas cloud may exist and linger within and/or around the debris disposal pits. These combustible gas clouds create a fire hazard at the drilling site, and downwind therefrom. Accordingly, many additional governmental regulations for shale-gas drilling relate to the handling and processing of debris from such wells in order to avoid a volatile, combustible gas cloud.

The foregoing issues show there is a need for an apparatus to separate the shale-gas-water mixture into non-volatile components, and provide environmentally safe collection and disposal of the shale debris, fluid and formation gas burned a safe distance from wellbore.

SUMMARY OF THE INVENTION

In one aspect, the following invention provides for a shale-gas separator. The shale-gas separator comprises a vessel and a jet assembly. The vessel has an intake pipe defined thereon, where the intake pipe is positioned to tangentially communicate a shale-gas-fluid mixture into the vessel. A gas release vent is defined on the vessel, and positioned to communicate gas therefrom. The jet assembly has a side opening connected to a port positioned on the bottom of the vessel. The jet assembly has a first end and a second end defined thereon. A jet is connected to the first end. A jet assembly outlet is secured to the second end.

In another aspect, a shale-gas separator and clearing apparatus is provided. The shale-gas separator and clearing apparatus comprises a vessel, a jet assembly and internal aerated cushion system (IACS) pipe. The vessel has an intake pipe defined thereon. The intake pipe provides tangential communication of a shale-gas-fluid mixture into the vessel. The vessel has a top and a bottom, where the top and the bottom each have a port disposed therethrough. The jet assembly is secured to the bottom. The jet assembly has a jetted input and a venturi output. The IACS pipe is centrally disposed within the vessel, and extends towards the port in the bottom. The IACS pipe has at least one discharge nozzle defined thereon.

In yet another aspect, a shale-gas separator dust eliminator is provided. The dust eliminator comprises a sidewall, an inlet and an outlet. There is at least one fluid jet disposed through the sidewall. There is a plurality of baffles positioned within the housing, where a first baffle is positioned beneath the fluid jet and oriented to deflect fluid towards the outlet. There is a second baffle complementarily positioned within the housing between the fluid jet and the outlet, wherein the baffles are positioned to interrupt the flow of fluid through the housing.

Numerous objects and advantages of the invention will become apparent as the following detailed description of the preferred embodiments is read in conjunction with the drawings, which illustrate such embodiments.

BRIEF DESCRIPTION OF THE DRAWINGS

FIG. 13A depicts a side view of a dust eliminator having spiraling baffles.

FIG. 13B is a sectional view taken from FIG. 13A along line 13B-13B, and illustrates one of the spiraling baffles.

FIG. 15A is a side view schematic of a slotted outlet muffler disposed within a housing.

FIG. 17 depicts a detail view of the vessel and fluid overflow bypass line.

DETAILED DESCRIPTION

Figure 1:
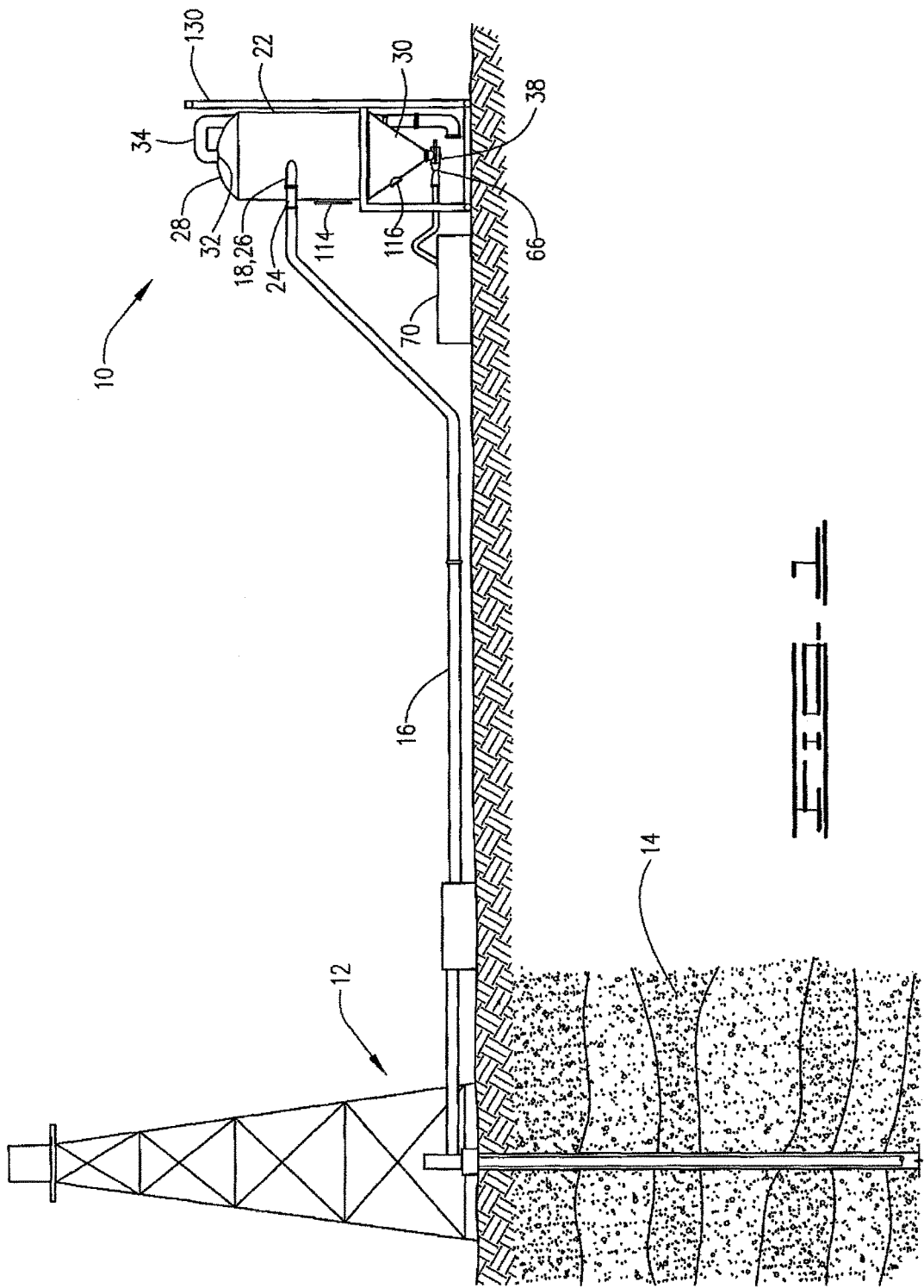
FIG. 1 depicts a simplified schematic elevational view of a wellsite in fluid communication with a shale-gas separator.
Figure 2:
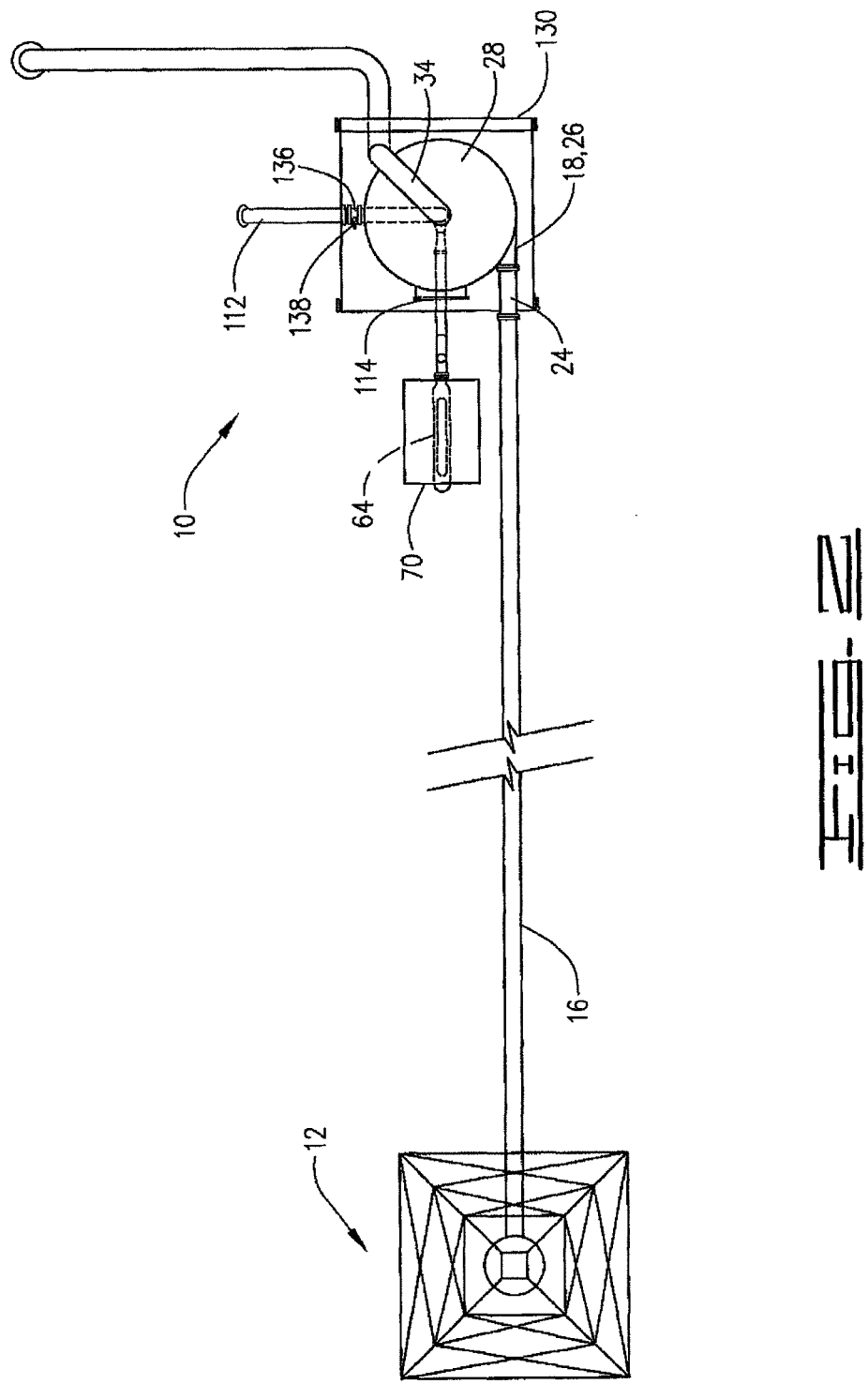
FIG. 2 depicts a simplified schematic plan view of a wellsite in fluid communication with a shale-gas separator.
Figure 3:
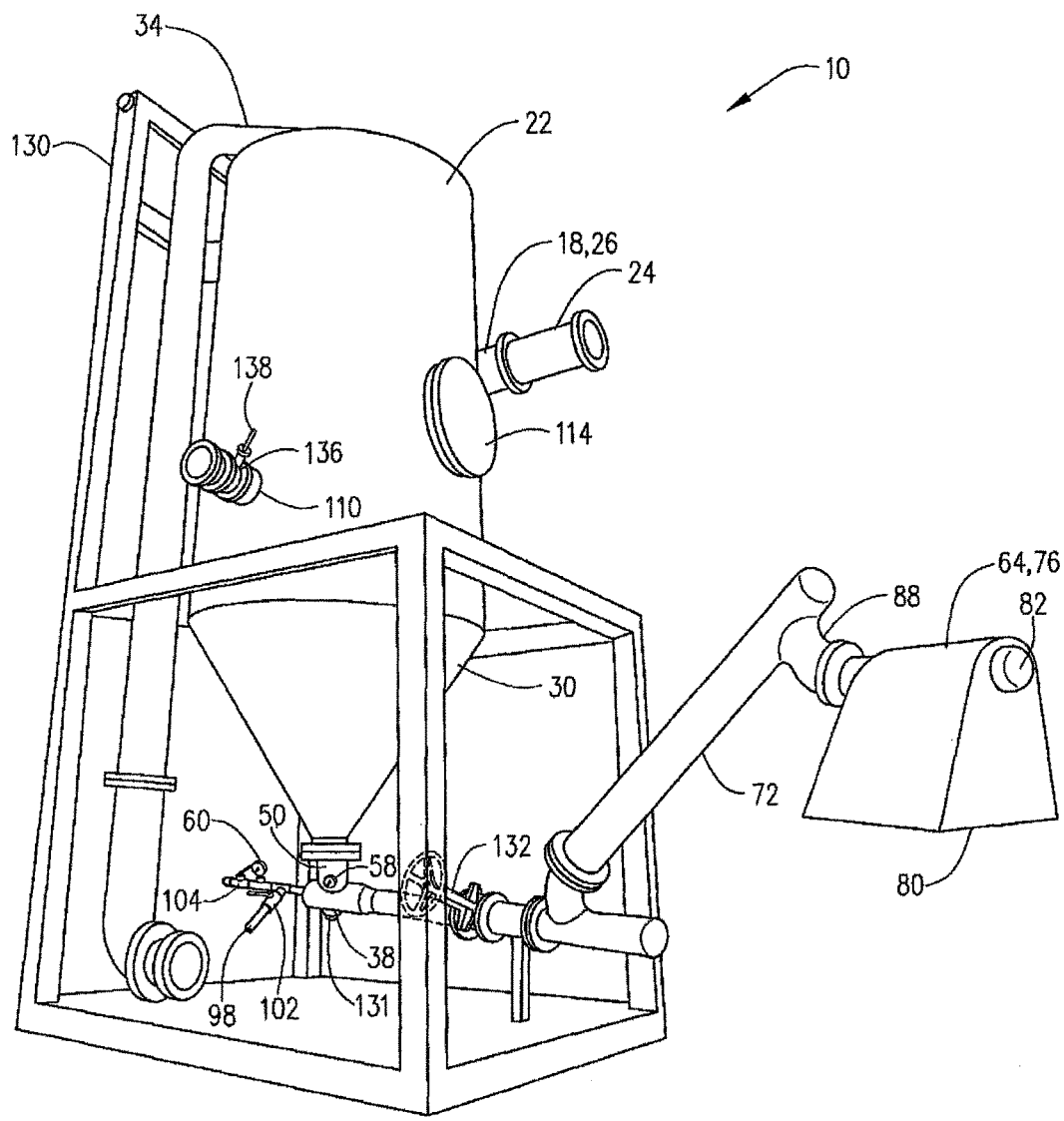
FIG. 3 depicts a lower left perspective view of a shale-gas separator.

Referring to FIGS. 1-3, the inventive shale-gas separator is illustrated and generally designated by the numeral 10. As shown by the drawings and understood by those skilled in the art, shale-gas separator 10 and components thereof are designed to be associated with a well 12. As discussed herein, shale-gas separator 10 is associated with well 12, shale formations 14 and drilling strategies. The drilling strategies include air drilling in shale formations. However, the invention is applicable to multiple drilling techniques with cuttings, dust, debris, gas and fluid from wells 12 other than those associated with shale formations 14.

Shale-gas separator 10 is in air/fluid communication with well 12. FIGS. 1 and 2 illustrate shale debris, dust, gas and fluid being communicated to shale-gas separator 10 in pipe 16. The fluid is typically water, mist, foam, detergent or aerated mud. Shale-gas separator 10 receives the shale-gas-fluid mixture at intake pipe 18. Intake pipe 18 is secured to and protrudes through wall 20 of vessel 22. Optional dust eliminator 24 is illustrated as being directly connected to intake pipe 18. However, dust eliminator 24 may also be positioned in-line with pipe 16.

Shale-gas separator 10, illustrated in FIGS. 1-7 illustrates vessel 22 in fluid communication with intake pipe 18. As illustrated in FIG. 3, intake pipe 18 flows into tangential input 26 through the sidewall 20 of vessel 22 and opens within vessel 22, thereby defining the tangential flow and initiating the cyclonic effect with vessel 22.

Vessel 22 is generally circumferential with domed top 28 and conical bottom 30. Domed top 28 has a port disposed therethrough. The port in domed top 28 functions as gas release vent 32, which is in fluid communication with flare stack feedline 34 and is capable of communicating gas from vessel 22 to a flare (not shown) placed sufficiently far enough from the well to mitigate any threat of accidental ignition of gas, Although not shown, gas release vent 32 optionally includes one-way valves, splash-guards, and/or back-flow preventers placed in flare stack feedline 34 prior to igniting the flare. Conical bottom 30 has port 36 disposed therethrough. Port 36 is in fluid communication with jet assembly 38.

Figure 4:
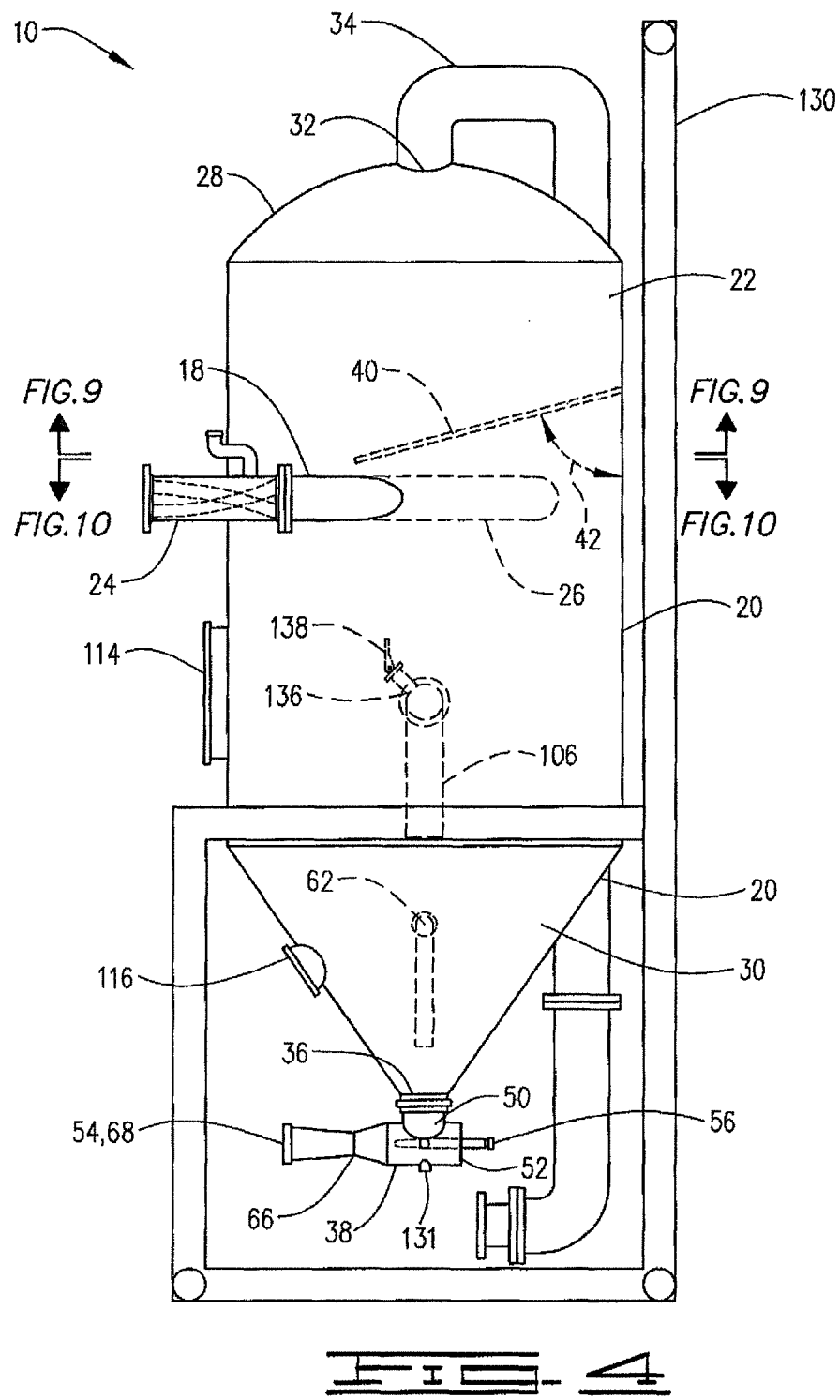
FIG. 4 depicts right side elevational view of a shale-gas separator.
Figure 5:
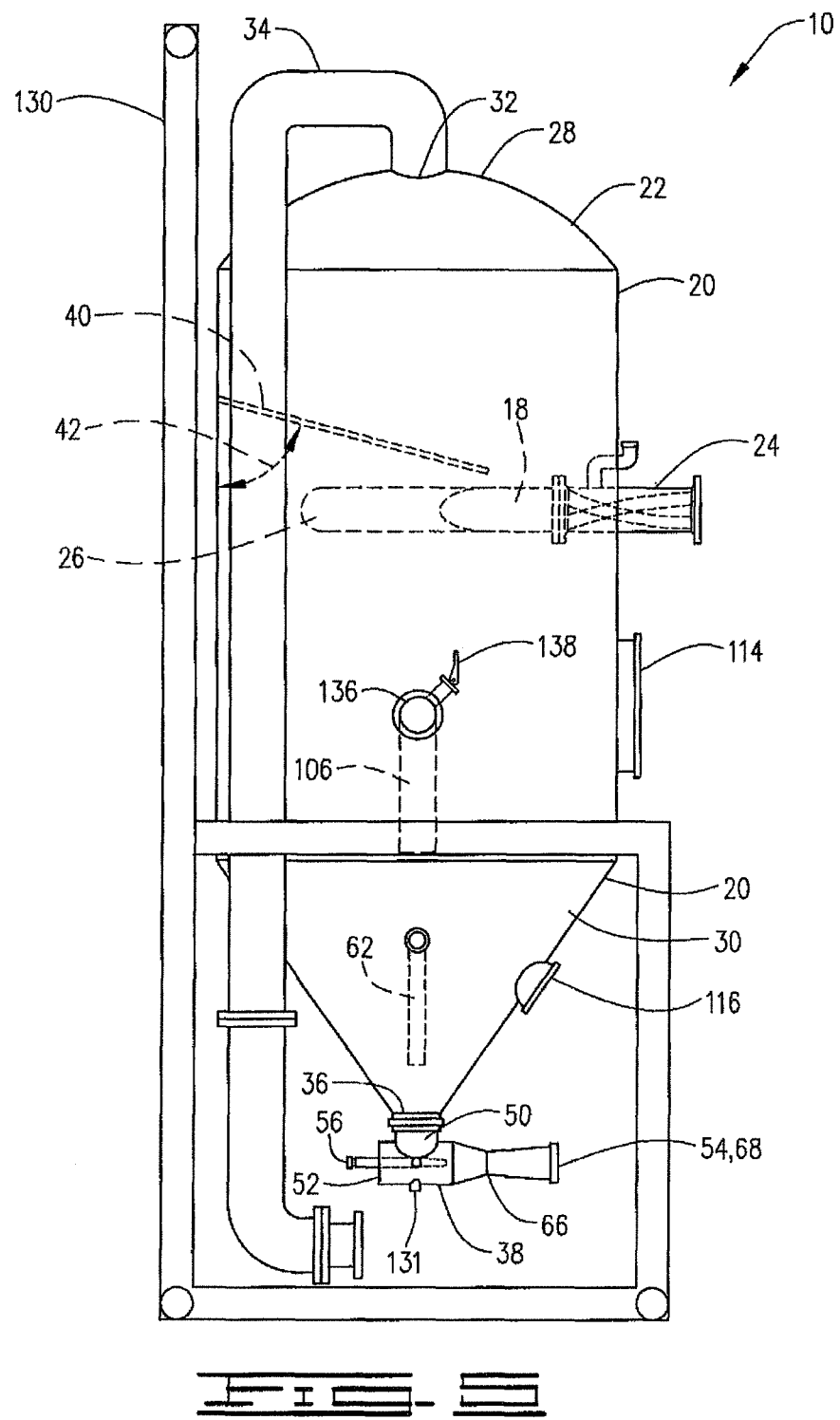
FIG. 5 depicts a left side elevational view of a shale-gas separator.
Figure 6:
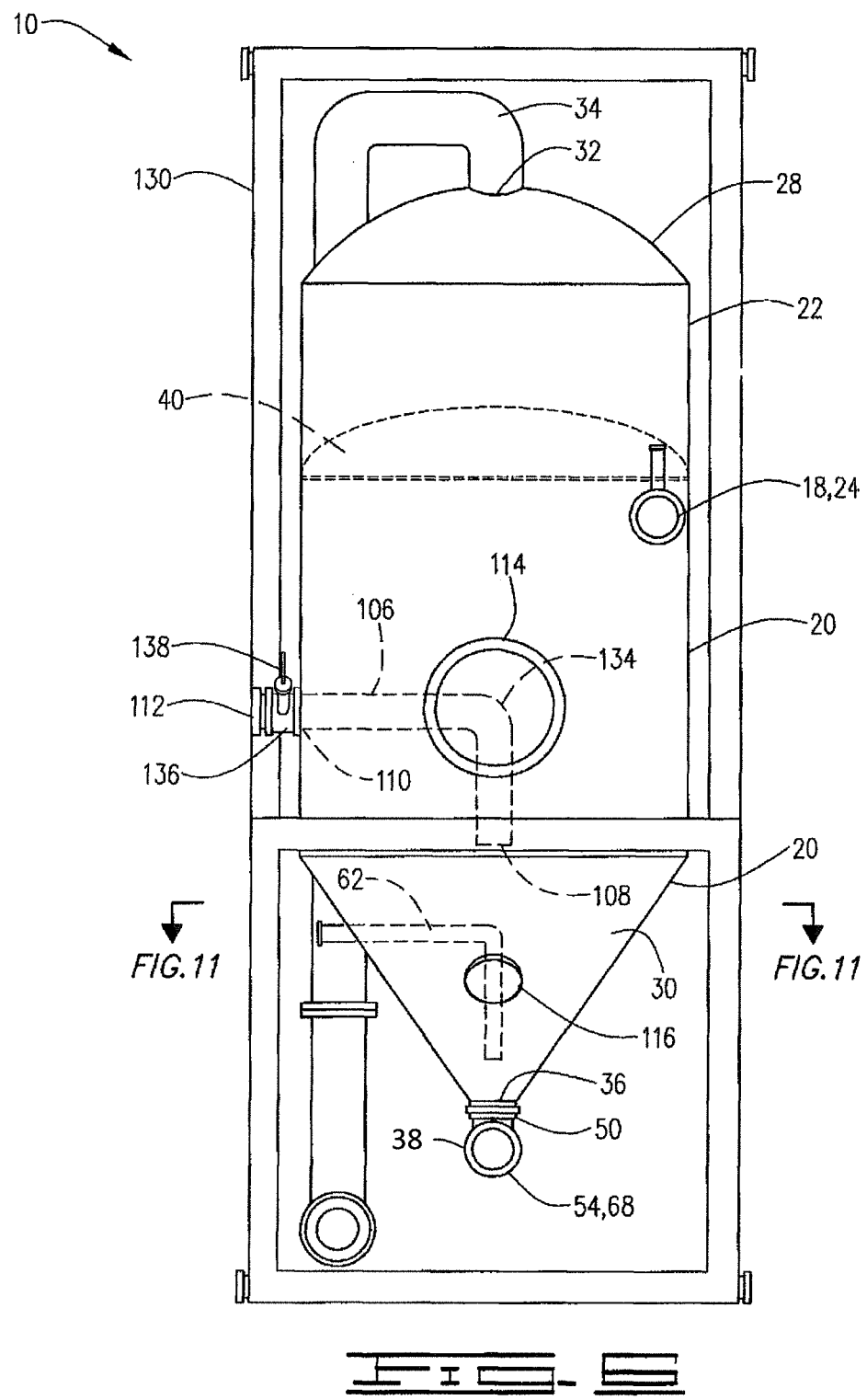
FIG. 6 depicts a front elevational view of a shale-gas separator.
Figure 7:
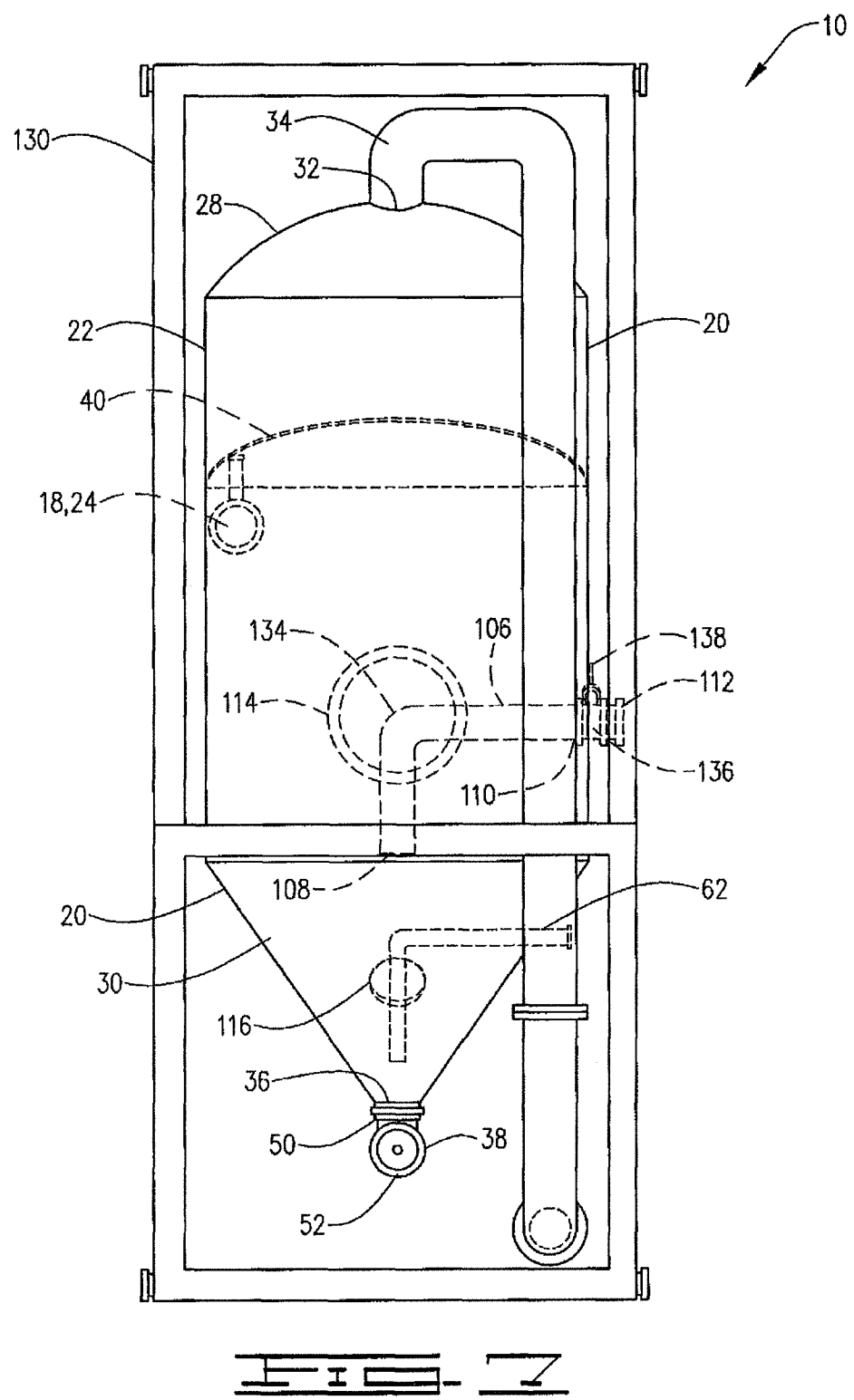
FIG. 7 depicts a rear side elevational view of a shale-gas separator.
Figure 8:
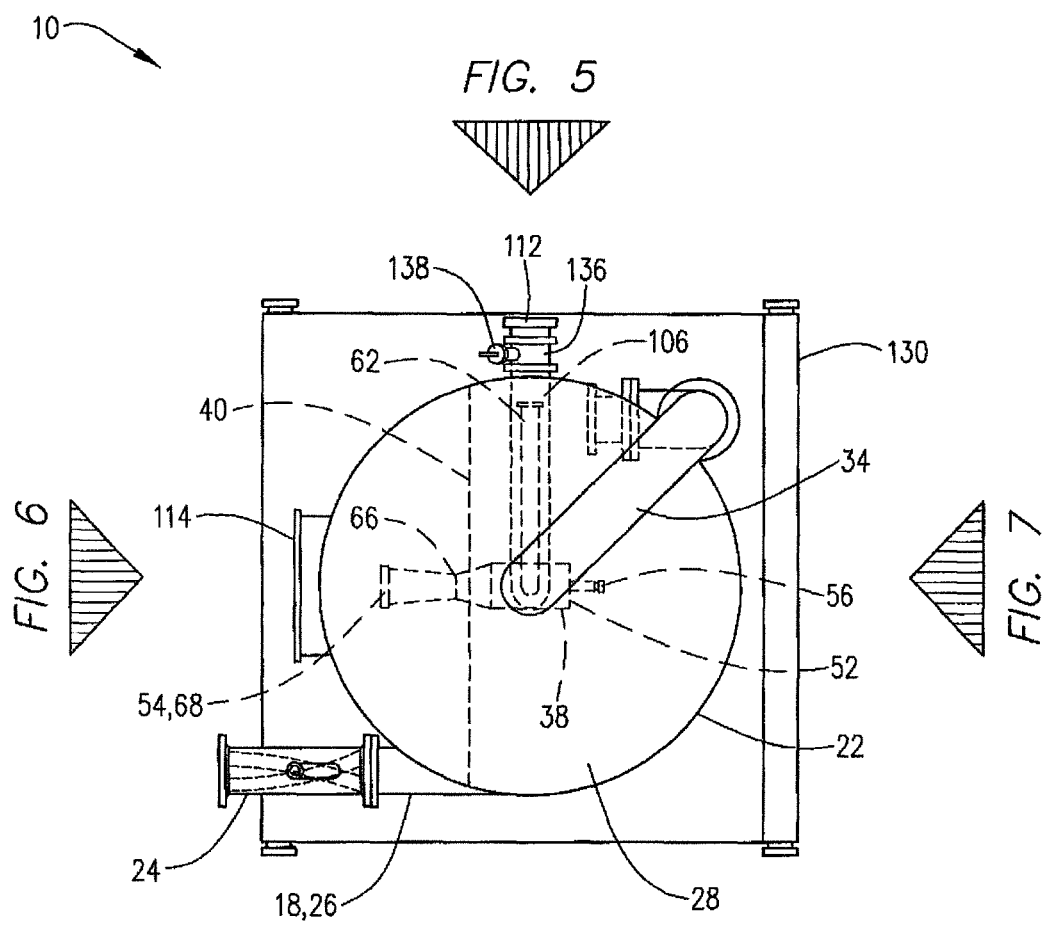
FIG. 8 is plan view of a shale-gas separator.
Figure 9:
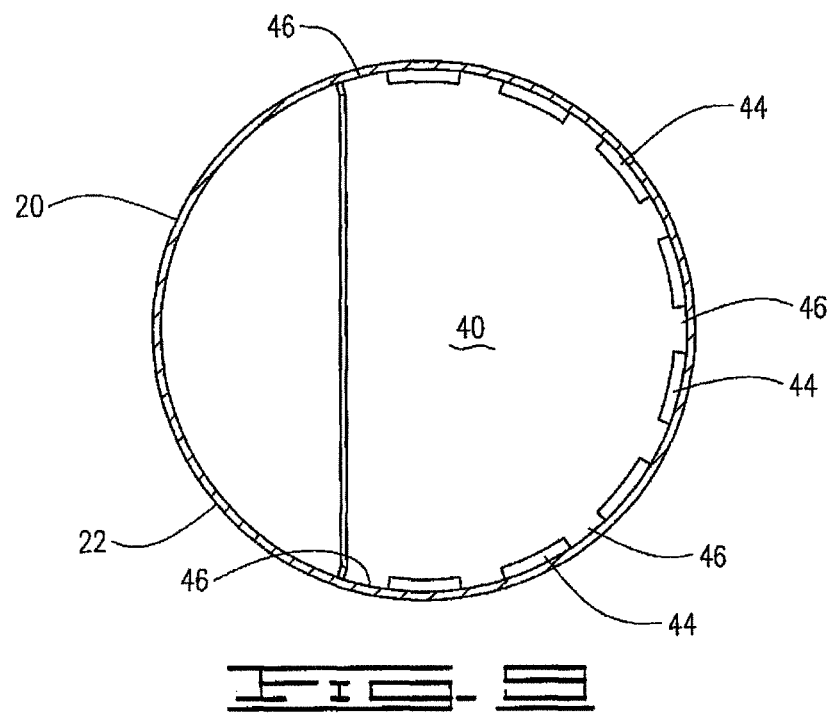
FIG. 9 is a sectional detail view taken from FIG. 4 along line 9-9, and illustrates a debris shield.

Interiorly disposed between tangential input 26 and gas release vent 32 is debris shield 40. Debris shield 40 interiorly extends outward from wall 20 and covers about 40 percent to about 75 percent of the inner diameter of vessel 22. As illustrated in FIGS. 4-9, debris shield extends across the inner diameter of vessel 22 about 4 feet (about 1.2 meters). Additionally, FIGS. 4 and 5 illustrate debris shield 40 as having downward angle 42 and being oriented towards conical bottom 30. Downward angle 42 is between about −5° and about −60° below the horizon, and is illustrated in FIGS. 4 and 5 as having an angle of about −15° below the horizon. Downward angle 42 provides for the downward deflection of shale debris and fluid, while allowing the separated gas to escape towards gas release vent 32. Debris shield 40 has gas vents 44 penetrating therethrough along edges 46 to facilitate gas release.

In operation, debris shield 40 receives the shale-gas-fluid mixture from intake pipe 18, and working in concert with the cyclonic effect communicated by intake pipe 18 and tangential input 26, causes the gas to separate from the shale-gas-fluid mixture. The separated gas rises towards gas release vent 32 where it is communicated from vessel 22. The shale debris and fluid fall towards conical bottom 30, where it is received by jet assembly 38.

Figure 10:
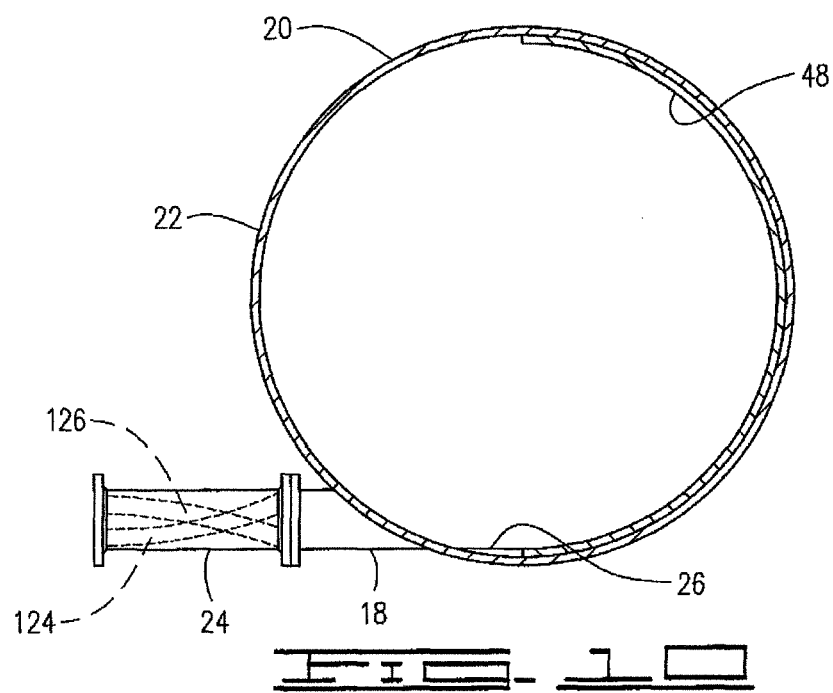
FIG. 10 is a sectional detail view taken from FIG. 4 along line 10-10, and illustrates an intake pipe having a tangential input and a wear plate.

FIG. 10 illustrates wear plate 48 secured to wall 20 and positioned to receive shale-gas-fluid mixture from intake pipe 18 and tangential input 26. Wear plate 48 may be permanently affixed to wall 20, or it may be removably affixed. As illustrated, wear plate 48 is interiorly welded to wall 20. In the alternative, not shown, wear plate 48 is bolted, or otherwise secured to wall 20. As illustrated, wear plate 48 is between about 18 inches to about 24 inches wide (about 0.46 meters to about 0.61 meters) and covers about one-half of the circumferential interior of wall 20. As illustrated, wear plate 48 is about 0.5 inches (about 1.3 centimeters) thick. Wear plate 48 begins where tangential input 26 ends within vessel 22. The longitudinal centerline (not shown) of wear plate 48 is centered on tangential input 26, Preferably, wear plate 48 and tangential input 26 are blended together to prevent any edges for input flow to impinge upon.

Figure 12:
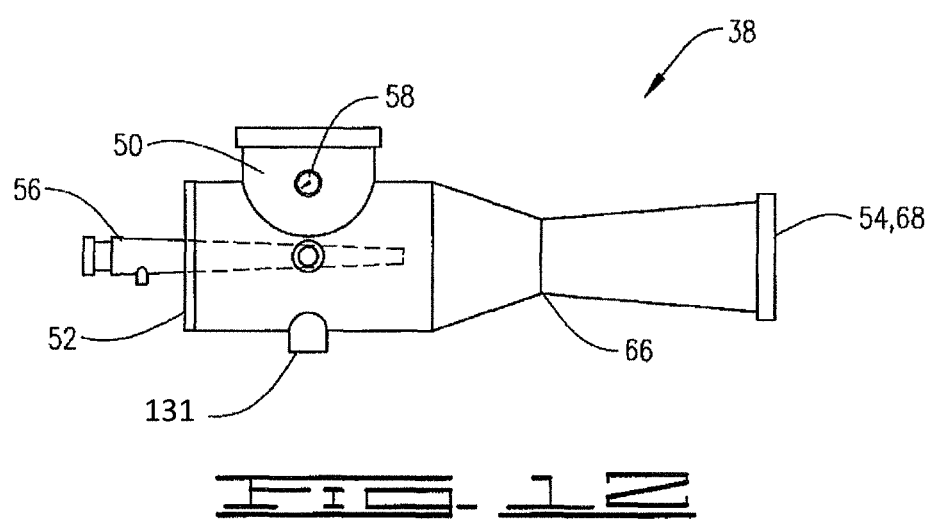
FIG. 12 depicts a side view of a jet assembly.
Figure 13C:
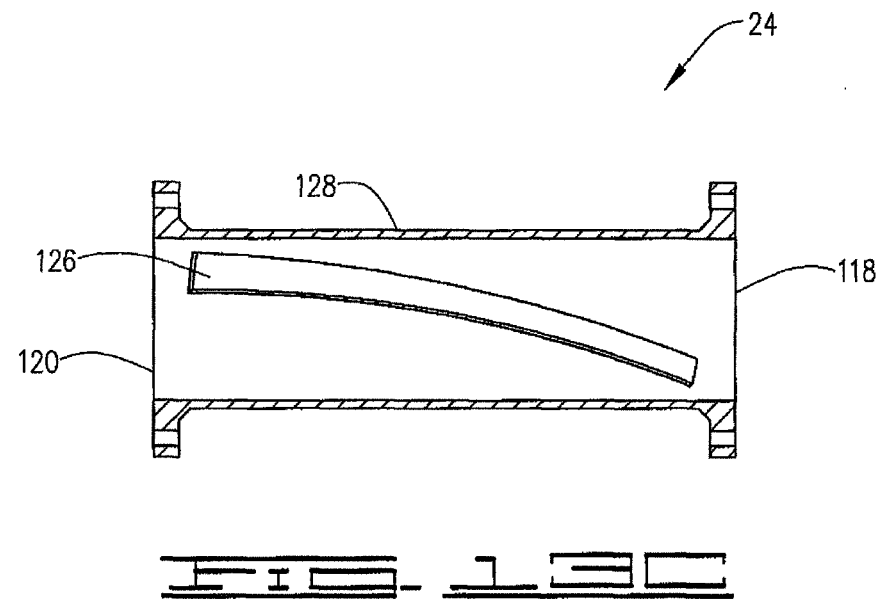
FIG. 13C is a sectional view taken from FIG. 13A along line 13C-13C, and illustrates another of the spiraling baffles.
Figure 13D:
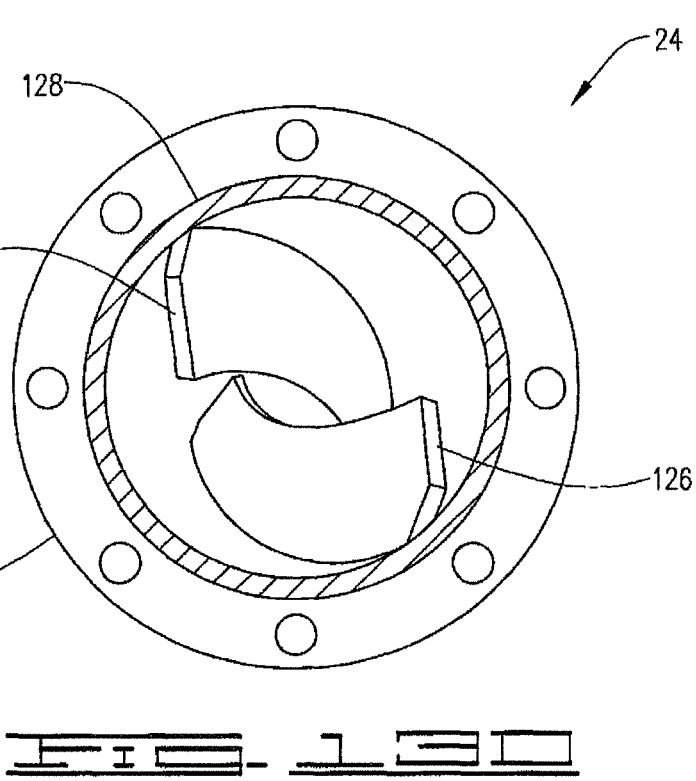
FIG. 13D is an elevational end view of a dust eliminator having spiraling baffles.

As illustrated in FIGS. 1, 3-8, 12 and 16, jet assembly 38 connects to port 36 of conical bottom 30 at a side opening thereon, also referred to as side receiver 50. Side receiver 50 has a shape facilitating the flow of debris and fluid into jet assembly 38. Side receiver 50 surrounds port 36, thereby providing for unimpeded flow into jet assembly 38. Jet assembly 38 has first end 52 and second end 54. First end 52 has jet 56 connected thereto. Referring to FIG. 12, jet 56 extends into jet assembly 38 along a center axis of jet assembly 38, and terminates between side receiver 50 and second end 54, Vacuum gauge 58 is illustrated in FIG. 12 as being positioned on side receiver 50 within jet assembly 38 to measure the drop in pressure or amount of vacuum pulled in inches or kilopascals. In practice, the amount of vacuum pulled by jet assembly 38 is about −10 inches of mercury to about −15 inches of mercury (about −34 kilopascals to about −51 kilopascals).

Jet 56 is capable of receiving fluid, either liquid or air, which in turn provides the motive force to the shale debris and fluid to exit through second end 54. Preferably, jet 56 is able to use compressed air, compressed inert gas, pressurized water, pressurized hydraulic fluid, or combinations thereof. Jet assembly 38 also has pressure gauge 60. Pressure gauge 60 provides feedback on the pressure of air/fluid flowing into jet assembly 38 through jet 56 and to internal aerated cushion system (IACS) pipe 62.

Second end 54 communicates the debris and fluid to outlet muffler 64. FIG. 12 depicts second end 54 as venturi 66. Jet assembly outlet 68, illustrated in FIGS. 4-6, 8, 12 and 16, communicates the debris and fluid from second end 54 to collection bin 70 via discharge line 72. In an alternative embodiment, venturi 66 is part of jet assembly outlet 68 that is secured to second end 54.

Figure 14A:
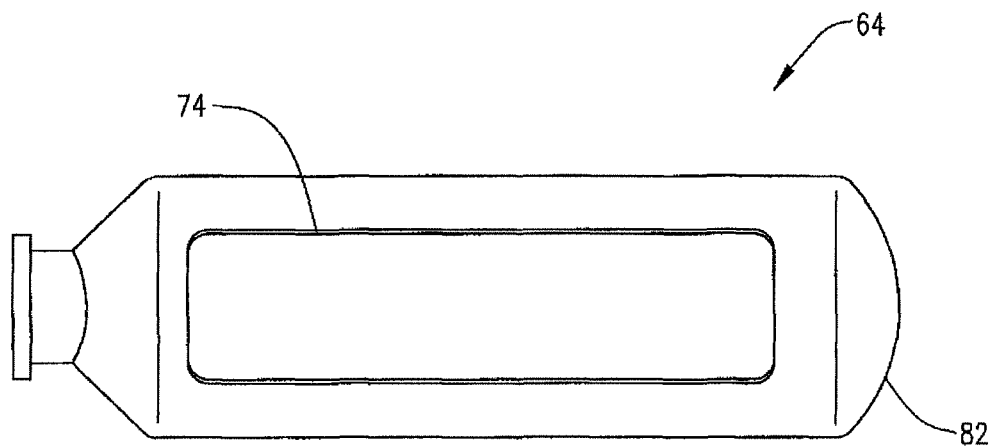
FIG. 14A is a bottom view schematic of slotted outlet muffler with the slot on one side.
Figure 14B:
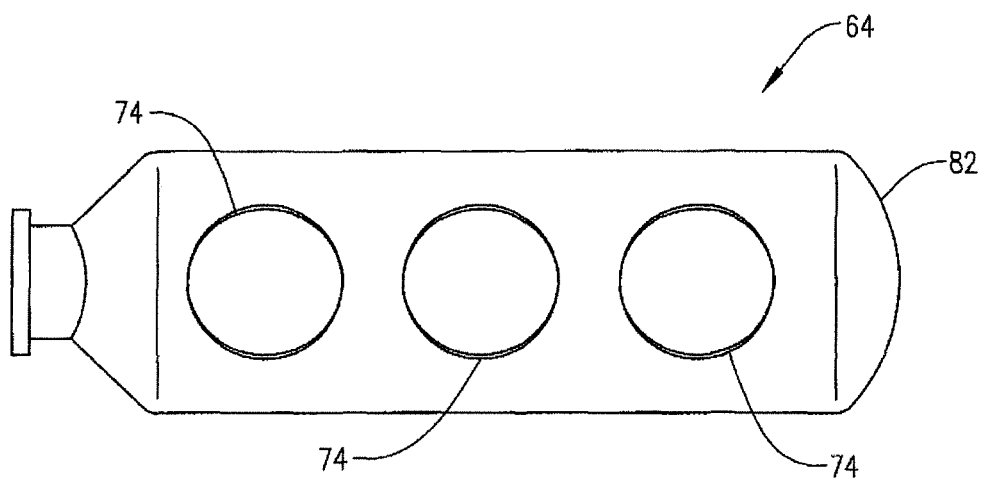
FIG. 14B is a bottom view schematic of an outlet muffler having holes on one side.
Figure 15B:
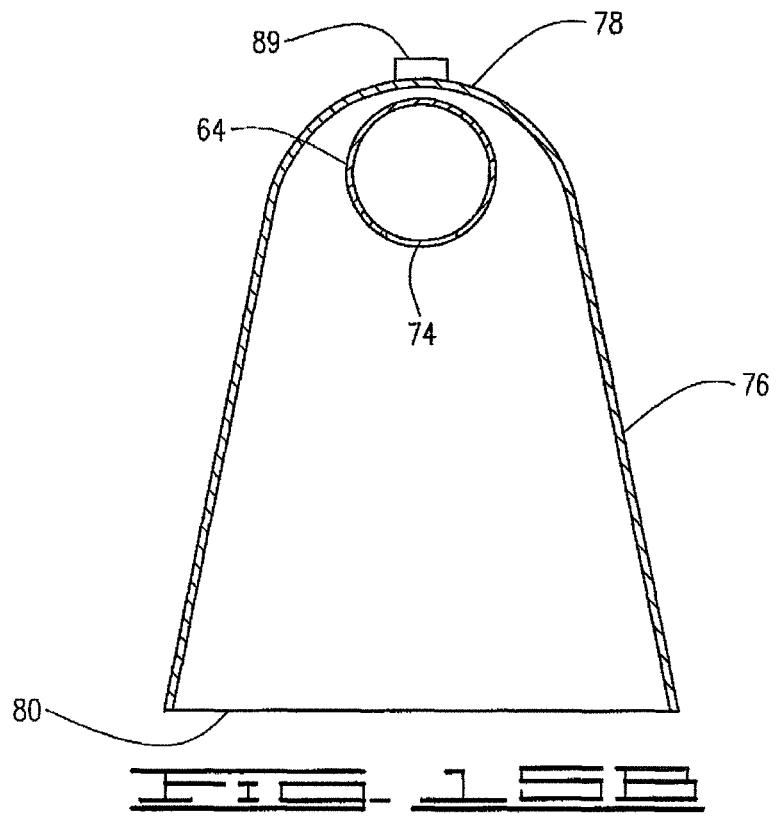
FIG. 15B is a sectional view of a slotted outlet muffler disposed within a housing taken from FIG. 15A along lines 15B-1B.
Figure 15C:
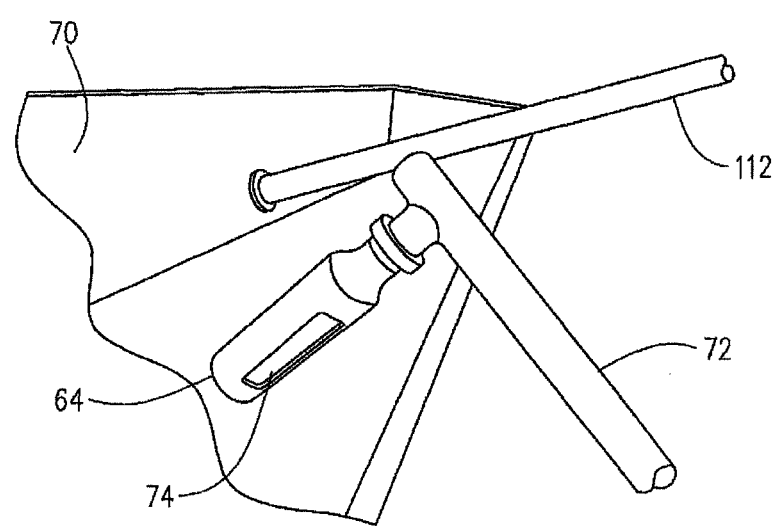
FIG. 15C depicts a perspective view of an alternative configuration of the collection bin, slotted outlet muffler without a housing and fluid overflow bypass line.

Jet assembly outlet 66 is secured to discharge line 72, which is in communication with outlet muffler 64. As illustrated in FIGS. 2 and 15C, outlet muffler 64 is positioned to discharge shale debris and fluid into collection bin 70. Outlet muffler 64 has at least one discharge port 74. As illustrated in FIGS. 2, 11A-12C, outlet muffler 64 has one to six discharge ports 74, but any number will provide the desired discharge. FIGS. 2, 14A, and 15A-15C illustrate discharge port 74 being a slot. FIG. 14B illustrates three discharge ports 74 as holes. Other shapes and sizes of discharge port 74 are understood to be included. For example, discharge port 74 can be elliptical or square. It is also anticipated that discharge line 72 can directly discharge the shale debris and fluid without outlet muffler 64, FIGS. 15A and 15B depict outlet muffler 64 with housing 76 surrounding it and being secured thereto. Housing 76 tapers outwardly from top 78 to bottom 80, as illustrated in FIGS. 2, 3, 15A and 15B. Also illustrated in FIGS. 2, 15A and 15B, is outlet muffler 64 with discharge port 74 oriented towards bottom 80, FIG. 15A shows one embodiment of outlet muffler 50 secured to housing 76. Additionally, outlet muffler cap 82 is illustrated as extending externally to wall 84 of housing 76. In this embodiment, discharge port 74 is a slot extending across a substantial depth 86 of housing 76.

Outlet muffler cap 82 provides impact baffling for debris discharging through outlet muffler 64. Alternatively, internal baffles (not shown) may be used to divert and slow the debris within outlet muffler 64. Another alternative is to not use outlet muffler 64 and secure housing 76 directly to elbow 88. This alternative has internal baffles or wear plates on wall 84.

FIG. 15A illustrates housing 76 with sniffer port 89 thereon. Sniffer port 89 provides access for a gas sniffer (not shown) to sample the output from outlet muffler 64 for the presence of gas, In this context, the gas sniffer includes the capability to detect one or more of the gaseous chemicals found in well 12. In the absence of housing 76, sniffer port 89 is positioned on outlet muffler 64.

Vessel 22 also includes IACS pipe 62. As illustrated in FIGS. 4-8 and 11, IACS pipe 62 is elongated and positioned within vessel 22. IACS pipe 62 is centrally positioned within conical bottom 30 of vessel 22, and located above port 36. IACS pipe 62 has at least one nozzle 66 defined thereon. IACS pipe 62 is positioned within vessel 22 to provide pressurized fluid to remove any debris buildup on wall 20 of conical bottom 30 down to port 36, In use, IACS pipe 62 provides a fluid cushion to mitigate the buildup of gas in jet assembly 38 and vessel 22.

Figure 11:
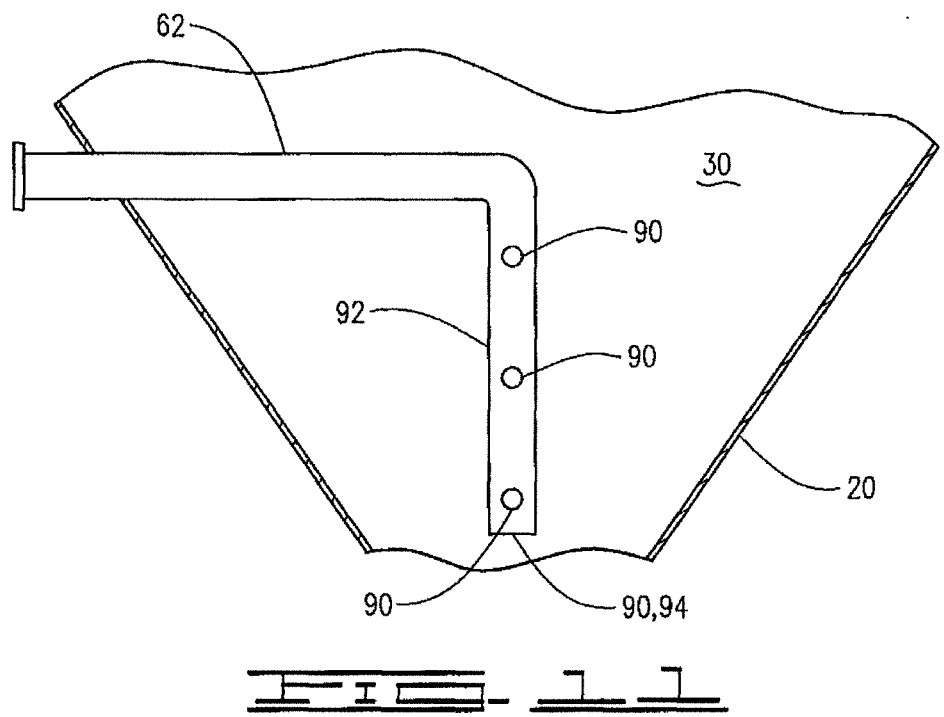
FIG. 11 is sectional view taken from FIG. 6, long line 11-11, and illustrates an internal aerated cushion system (IACS) pipe.

The non-limiting example in FIG. 11 depicts IACS pipe 62 having three to five sets of nozzles 90 positioned along longitudinal portion 92 of IACS pipe 62. Additionally, the non-limiting example depicts another three cleanout nozzles 90 secured to IACS pipe end 94, and are downwardly oriented. By way of another non-limiting example, if longitudinal portion 92 of IACS pipe 62 is about three (3) feet (about 1 meter) in length, nozzles 90 are spaced along longitudinal portion 92 with spacing of about six (6) inches to about 18 inches (about 0.15 meters to about 0.5 meters). The spacing between cleanout nozzles 90 is determined by the size of vessel 22. As shown in FIG. 11, the spacing between nozzles 90 is about twelve (12) inches (about 0.3 meters). There may be a plurality of nozzles 90 circumferentially positioned along longitudinal portion 92 at each spacing. Alternatively, there may be a plurality of nozzles 90 circumferentially and offsettingly positioned along longitudinal portion 92 at operator desired spacing.

Referring to FIGS. 4-8 and 11, IACS pipe 62 is secured to and through wall 20. Although IACS pipe 62 is illustrated as a single line, it may be formed out of several pipe sections, IACS pipe 62 is in fluid communication with pressurized fluid line 96 with line 98 at t-joint 100. Line 98 has valve 102 disposed between pressurized fluid line 96 and IACS pipe 62. Valve 102 provides control of the fluid communicated to IACS pipe 62, and is illustrated as a manually operated valve. However, automating valve 102 is understood to be within the skill of one knowledgeable of the art.

Figure 16:
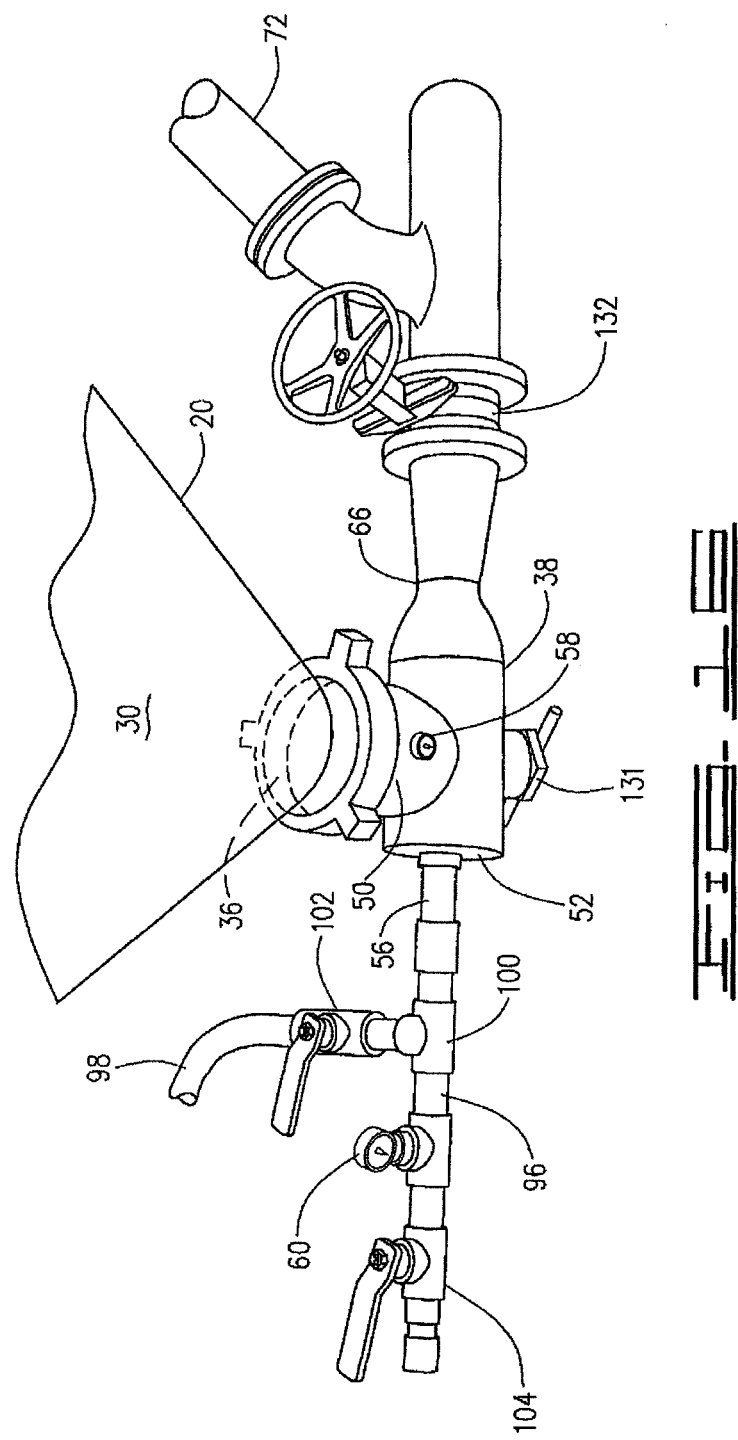
FIG. 16 depicts a perspective view of a jet assembly and pressurized fluid input lines, and optional valve.

As illustrated in FIG. 16, pressurized fluid line 96 communicates pressurized fluid to jet 56 and to IACS pipe 62 through line 98. Valve 104 is positioned upstream from t-joint 100 and pressure gauge 60, and controls the fluid communicated to jet 56. Valve 104 may also be manually or automatically operated. Although, using the same fluid for both jet 56 and IACS pipe 62 is preferred, an alternative is to use separate types of fluid communicated through separate supply lines (not shown). For example, compressed air is communicated to jet assembly 38 and pressurized water is communicated to IACS pipe 62. Compressed air will be the most common fluid communicated through pressurized fluid line 96 and line 98 due to its availability at the wellsite.

FIG. 16 also illustrates pressure gauge 60 and vacuum gauge 58 as described above. Preferably, valve 104 is adjusted to set a minimum vacuum condition in jet assembly 38. One embodiment facilitates achieving the above-mentioned desired vacuum range of about −10 inches of mercury to about −15 inches of mercury (about −34 kilopascals to about −51 kilopascals). In this embodiment, jet 56 operates using fluid having a pressure in the range of about 75 pounds per square inch to about 200 pounds per square inch (about 517 Kilopascals to about 1,379 Kilopascals). Valve 104 is adjustable until vacuum gauge 58 indicates the vacuum is within desired range.

FIGS. 4-8 illustrate fluid overflow bypass line 106, or overflow line 106. Overflow line 106 communicates any excess fluid buildup within vessel 22 away from vessel 22. As illustrated, intake port 108 is oriented towards conical bottom 30, is centrally positioned within vessel 22 and below than intake pipe 18. Preferably, intake port 108 is also positioned above IACS pipe 62.

Overflow line 106 is secured to and through wall 20 at point 110. Preferably, point 110 is below intake pipe 18. Overflow line 106 is connected to fluid bypass discharge line 112, or bypass line 112. Bypass line 112 discharges to any receptacle capable of receiving the fluid, with one example shown in FIG. 15C. Preferably, bypass line 112 discharges to another device (not shown) capable of separating any gas from the fluid.

To provide additional access to vessel 22, at least one manway 114 and at least one cleanout/observation hatch 116 are utilized and disposed through wall 36. Manway 114 is disposed through wall 20 above conical bottom 30. Cleanout/observation hatch 116 is disposed through wall 20 of conical bottom 30. Manway 114 and cleanout/observation hatch 116 are sized to provide complete or partial access to the interior of vessel 22. As shown, manway 114 is about 24 inches (about 0.6 meters), and cleanout/observation hatch 116 is about 10 inches (about 0.25 meters).

As illustrated in FIGS. 1-8, 10 and 13A-D dust eliminator 24 has inlet 118, outlet 120, fluid jet 122, and a plurality of baffles. As illustrated, the plurality of baffles include first spiral baffle 124 and second spiral baffle 126. Fluid jet 122 is disposed through sidewall 128 of dust eliminator 24 near inlet 118. First spiral baffle 124 and second spiral baffle 126 are positioned from about inlet 118 to about outlet 120. Second spiral baffle 126 is complementarity positioned within dust eliminator relative to first spiral baffle 124. Fluid jet 94 is positioned near inlet 118 above first spiral baffle 124 and second spiral baffle 126. First spiral baffle 124 and second spiral baffle 126 deflect the fluid, typically water, being propelled from fluid jet 122 towards outlet 120. First spiral baffle 124 and second spiral baffle 126 interrupt an axial flow of fluid and debris through the dust eliminator, thereby inducing a spiraling flow of the fluid and debris through dust eliminator 24. This spiraling flow action causes the dust and fluid to mix, thereby reducing dust.

An alternative for first spiral baffle 124 and second spiral baffle 126 is to use offsetting baffles (not shown) that are alternating and obliquely positioned. In this case, the first baffle will be obliquely positioned below fluid jet 122 and capable of deflecting the fluid towards outlet 120. The subsequent baffles alternate and provide points of impact for the fluid and the debris of shale-gas. The fluid impacts interrupt flow of fluid through the dust eliminator 24. In this setup, there are at least two baffles and preferably three or more baffles.

Referring to FIGS. 1-8, shale-gas separator 10 is shown as being carried by skid 130. Preferably, skid 130 is transportable across a standard U.S. highway.

In an embodiment illustrating the use of shale-gas separator 10, a typical well 12 using shale-gas separator 10 discharges the shale-gas debris through pipe 16 to the optional dust eliminator 24, where a fluid, such as water, is injected therein and encounters the debris, thereby reducing and/or eliminating any dust. The shale-gas debris may be shale-gas-fluid debris. Exiting from the optional dust eliminator 24, the debris is communicated to vessel 22 where it is cyclonically communicated therein through intake pipe 18 and tangential input 26.

The debris cyclonically spins around within vessel 22. In a non-limiting example, vessel 22 has a diameter of about 72 inches (about 1.83 meters). In this same non-limiting example, debris shield 40 has 15-degree downward angle 42 and covers about 66 percent of the interior of vessel 22, which is about four (4) feet (about 1.2 meters). Debris shield 40 restricts and deflects solids and fluid downwardly, away from gas release vent 32. The released gas is communicated upwardly to gas release vent 32, whereby it is further communicated to flare stack feedline 34 and burned at a flare positioned a safe distance from the well 12.

The solid debris and fluid fall downwardly into conical bottom 30 and through port 36 where the solids and fluid enter jet assembly 38. Jet 56, using air or fluid, propels the solids and fluid through jet assembly 38 to venturi 66. As the solids and fluid flow through venturi 66, they are propelled to outlet muffler 64. Outlet muffler 64 discharges the solids and fluid into collection bin 70.

If jet assembly is blocked or clogged, IACS pipe 62 is positioned to provide high-pressure fluid that is expelled through cleanout nozzles 90 within conical bottom 30. The high-pressure fluid is commonly air due to the availability at wellsites. The high-pressure fluid creates a cushion or barrier to keep gas from being communicated to jet assembly 38. The placement of IACS pipe 62 provides for maximum or additional force of pressurized fluid to further motivate the solids out of conical bottom 30 of vessel 22. Additionally, IACS pipe 62 provides fluid to remove debris build up on the interior of wall 20 of vessel 22. For this non-limiting example, the supply of fluid is from the same source of fluid provided to jet 56. However, separate sources of fluid for IACS pipe 62 and jet 56 are equally acceptable as is the same source. Additionally, for this non-limiting example IACS pipe 62 is about 2 inches (about 5 centimeters) in diameter.

Jet assembly 38 has an additional clean out port, or cleanout plug 131. Clean out plug 131 is illustrated in FIG. 16 as being oppositely positioned side receiver 50. In the event jet assembly 38 becomes too clogged to clean it out with pressurized air or fluid, plug 131 can be removed for manual cleaning.

Referring to FIG. 16, valve 132 is illustrated as being positioned between second end 54 and outlet muffler 64. Valve 132 is optional and provides a means to prevent all flow from vessel 22 through jet assembly 38. In this instance, all flow can be forced through overflow line 106. As illustrated in FIG. 16, valve 132 is a knife valve, but any valve capable of preventing flow will work. In one embodiment, valve 132 is air actuated. As shown in FIGS. 3 and 16, valve 132 is manually operated.

Overflow line 106, functioning as a bypass, provides for a means to passively remove excess fluid, which is typically water, accumulating within vessel 22, As the fluid accumulates, it begins to enter intake port 108 until it reaches first turn 134. At that time, the fluid begins to flow out of overflow line 106 and into discharge line 112, where it is deposited into an approved receptacle. As described in this non-limiting example, overflow line 106 and discharge line 112 are each about 6 inches (about 0.15 meters) in diameter.

Referring to FIGS. 2-8 and 17, external valve 136 is utilized to open and close overflow line 106 to control fluid communication from overflow line 106 to bypass line 112. External valve 136 may be automated, or it may be manual. The manual system of external valve 136 is illustrated with handle 138 to open and close it. In the manual mode, an internal indicator float (not shown) and float signal 140, as shown in FIG. 17, are used to notify an operator to open the external valve 136. The same float and signal 140 are automatically integrated with an automated system. Signal 140 can be audible, visual, electronic, or a combination thereof.

FIG. 17 depicts optional vessel pressure gauge 142. Vessel pressure gauge 142 provides the operator with feedback on the current pressure within vessel 22.

Other embodiments of the current invention will be apparent to those skilled in the art from a consideration of this specification or practice of the invention disclosed herein. Thus, the foregoing specification is considered merely exemplary of the current invention with the true scope thereof being defined by the following claims.

What is claimed is:

1. A shale-gas separator, comprising:
   a vessel into which a shale-gas-liquid mixture is adapted to be communicated;
   a first port adapted to communicate from the vessel a gas;
   a second port adapted to communicate from the vessel a shale debris and fluid separated from the shale-gas-liquid mixture; and
   an overflow line disposed in the vessel to communicate away from the vessel any excess fluid buildup within the vessel, the overflow line comprising an intake port;
   wherein the vessel comprises a top through which the gas vent is disposed, and a conically-shaped bottom through which the second port is disposed;
   wherein the intake port of the overflow line is oriented towards the conically-shaped bottom;
   wherein the shale-gas separator further comprises an intake pipe connected to the vessel and via which the shale-gas-liquid mixture is adapted to be communicated into the vessel;
   wherein the intake port of the overflow line is vertically positioned between the second port and the intake pipe;
   wherein the shale-gas separator further comprises an internal aerated cushion system (IACS) pipe adapted to provide a fluid cushion within the vessel, the IACS pipe being centrally disposed within the conically-shaped bottom; and wherein the IACS pipe is vertically positioned between the second port and the intake port of the overflow line and thus the intake port of the overflow line is vertically positioned between the IACS pipe and the intake pipe.

* * * * *